June 9, 1942.   M. GALLAI-HATCHARD   2,286,078
FOAMING OR GRANULATING MOLTEN MATERIAL
Filed Feb. 28, 1940    3 Sheets-Sheet 3
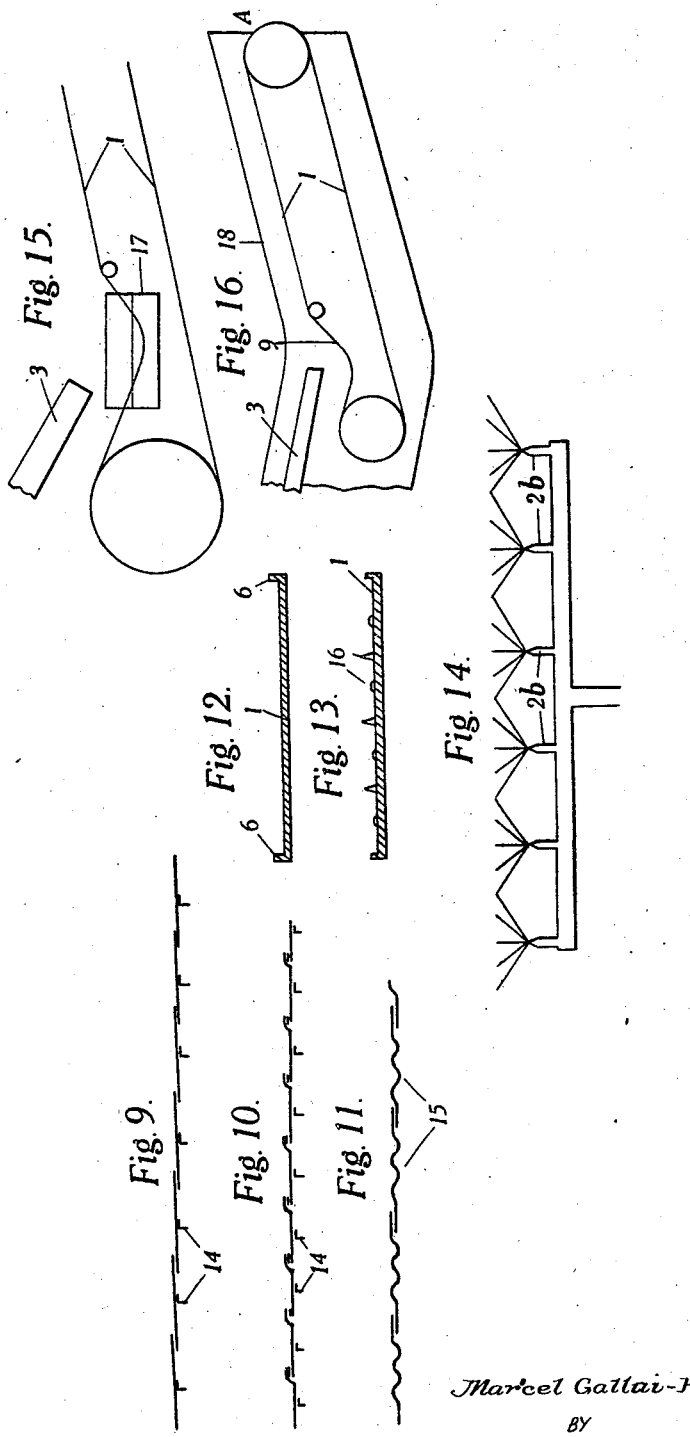
INVENTOR
Marcel Gallai-Hatchard
BY
Munn, Anderson & Liddy
ATTORNEYS Patented June 9, 1942

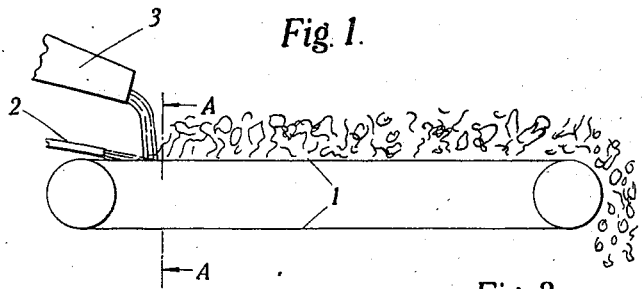
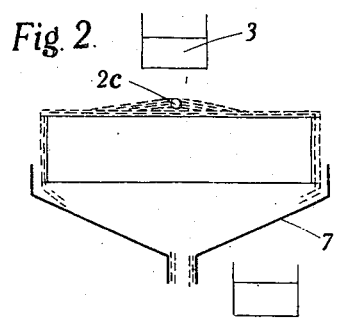
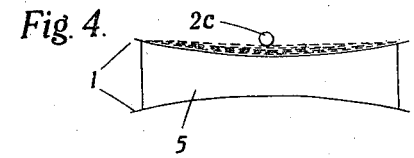
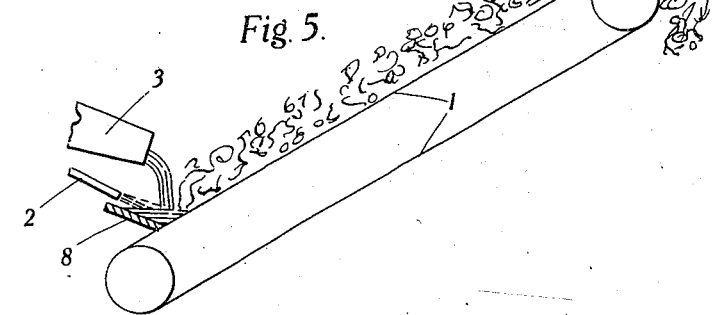
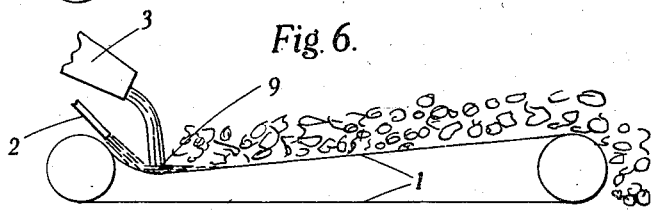

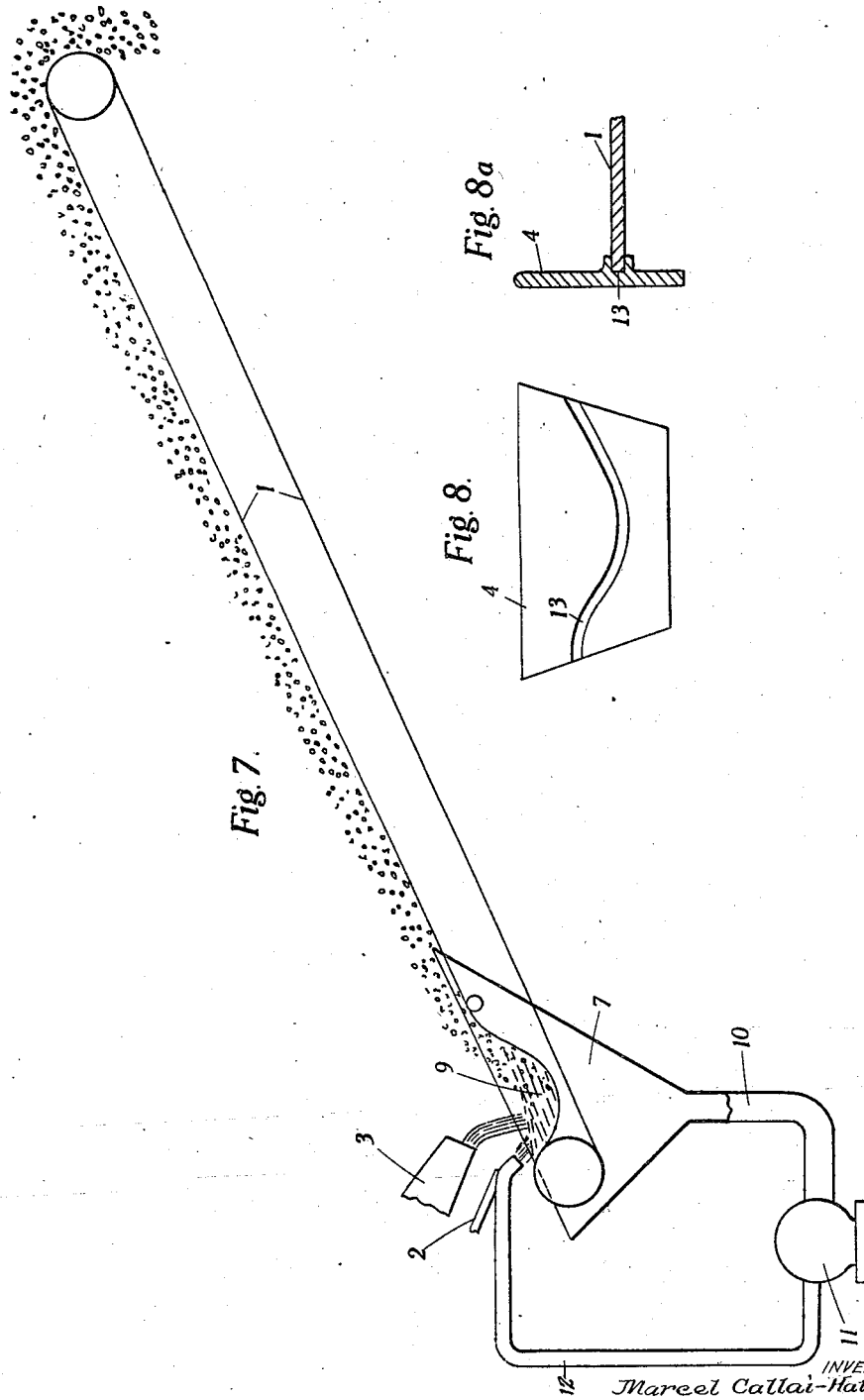

2,286,078

UNITED STATES PATENT OFFICE 2,286,078

FOAMING OR GRANULATING MOLTEN MATERIAL

Marcel Gallai-Hatchard, London, England, assignor to Holland & Hannen and Cubitts Limited, London, England Application February 28, 1940, Serial No. 321,165 In Great Britain January 31, 1939

5 Claims. (Cl. 49—14)

This invention relates to foaming or granulating molten blast furnace slags or other suitable molten material and provides improved apparatus whereby such material may be foamed or granulated and also subjected to further treatment if desired.

The foaming of molten material has been effected up to now with various forms of apparatus.

In the majority of cases, the molten slag or other material has been brought into contact with a controlled quantity of water in a number of compartments, generally arranged as parts of revolving wheels: such apparatus is referred to as the "foaming wheel" type. Such an apparatus is described in Giller's United States Patent No. 1,843,716 which describes a multiple compartment foaming wheel and also a series of foaming compartments combined in the manner of an endless chain.

Another form of apparatus which has been used was different in principle and consisted of a straight or curved chute on which a film of water was produced by special devices, the foaming being effected while the material slid or was washed down the chute. In connection with and in addition to this kind of apparatus, conveyors or bucket elevators have been used for the cooling and conveying of the material.

The above forms of apparatus and their methods of use had substantial drawbacks.

None of the methods gave the material a chance of completing the foaming process properly. Hardly had the foaming started when the product had to leave the apparatus, only too often without carrying the foaming to perfect conclusion. Another essential drawback consisted in the fact that the foamed material, when leaving the apparatus, was in a semi-molten plastic state and was dropped in this state into a pit or conveyor or elevator, thus destroying a very substantial percentage of its cells and producing instead, solid, dense lumps. Both these factors, that is to say imperfect foaming and destroyed cells, lead to increased weight.

Another disadvantage was the various known forms of foaming apparatus was the substantial headroom they required, particularly if used with an additional conveyor. Foaming at the source of the molten material—(which is the straightforward and correct method of foaming)—very often constituted an insurmountable problem owing to the lack of available headroom.

A method has also been proposed for the production of foamed slag by admitting a foaming agent onto the slag from all sides, from below through perforations in the bottom and sides of the receptacle and from above by spraying it through jets or nozzles directly on to the slag. For use with this method devices have been proposed which consist of a plurality of shallow receptacles or pans with flat perforated bottoms and perforated sides, these pans being mounted in the form of a movable endless chain. It will be apparent that such a device is not suitably constructed or arranged to support a layer of water since the water would escape through the perforated bottom and sides of the pans.

Apparatus in accordance with the invention, comprises a band conveyor so arranged as to support a layer of water and thus providing a water treatment zone on the band itself into which the molten material can be guided. In foaming processes, such as, for instance, the production of foamed blast furnace slag, the depth of water required is relatively small, a mere film being required in connection with highly active materials, whilst deeper layers of water are required for less active ones and still more water for granulation purposes.

One form of apparatus in accordance with the invention comprises a band conveyor on which, by the combination of the provision of sideplates or the like and control of the supply of water and of the speed of the band conveyor, a film of water can be maintained at the point where the molten material reaches the conveyor.

Another form comprises a band conveyor, part of the working run of which is so guided, for example by jockey pulley or like means, that a depression or pocket is formed in the upper surface, which may receive water which is retained by means of side plates or other appropriate expedients.

Methods of treating molten material in accordance with the invention include guiding the slag or other molten material into a layer of water supported by a band conveyor.

Some forms of apparatus in accordance with the invention, and their methods of use, will now be described, by way of example, with reference to the accompanying drawings, in which:

Fig. 1 is a diagrammatic representation, in side elevation, of one form of apparatus, Figs. 2, 3 and 4 represent cross-sections taken on the line A—A of Fig. 1 to illustrate alternative forms of details of the apparatus, Figs. 5, 6 and 7 are representations, similar to that of Fig. 1, illustrating further forms of apparatus, that shown in Fig. 7 being intended for granulation purposes.

Figs. 8 and 8a represent views at right angles to each other, the latter in section, illustrating a detail applicable, for example, to apparatus as shown by Figs. 6 and 7, and Figs. 9, 10, 11, 12 and 13 are diagrammatic representations illustrating details applicable to apparatus shown by any of Figs. 1, 5, 6 or 7, Fig. 14 is a plan view of parts shown in Fig. 3, Fig. 15 is a diagrammatic representation, in side elevation, of a still further form of apparatus, and Fig. 16 is a similar representation of apparatus in accordance with the invention incorporating means for drying material granulated therein.

The form of apparatus shown by Fig. 1 comprises an endless conveyor band 1 upon which, by suitable control of the rate of supply of water from a delivery device 2 and of the speed of the conveyor, a film of water can be maintained at a point at which molten material is delivered onto the conveyor by a delivery device 3.

Lateral retaining means may be provided if necessary to prevent the lateral escape of water from the water-treatment zone. The cross-sectional representations of Figs. 3, 4 and 12 illustrate examples of convenient lateral retaining means for the water. As shown in Fig. 3, side plates 4 are provided in substantial contact with the sides of the conveyor bands; in Fig. 4 the band 1 is shown troughed by the use of supporting rollers 5 of concave surface, whilst the band illustrated by Fig. 12 has upstanding portions 6, 6 at its opposite edges.

Alternative forms of the water-delivery device 2 are illustrated by Figs. 2, 3, 4 and 14. Figs. 2 and 4 show each a device comprising a single longitudinally-directed nozzle 2c, whilst Fig. 3 and the plan view of Fig. 14 show a plurality of nozzles 2b directed along the conveyor.

In Figs. 2 and 3, the reference numeral 7 indicates a collecting funnel for the collection of surplus water.

In the form of apparatus shown in Fig. 5, the conveyor band 1 is inclined and a pocket to receive water and form the treatment zone is provided by a plate or the like 8, which makes substantial contact with the band, lateral retaining means being provided as before where necessary.

In the form shown in Fig. 6, part of the working run of the band conveyor is so guided, for example by jockey pulley or other suitable means, that a depression or pocket is formed in its upper surface, as at 9, to receive water which is delivered by the device 2 and retained by lateral retaining means as before.

Fig. 7 illustrates an example of apparatus intended for granulation and in which the working run of the band conveyor is appropriately guided to form a pocket 9, the pocket illustrated being relatively deep to enable it to receive sufficient water for the carrying out of a granulation process. In this case, the conveyor as a whole is inclined and the funnel 7, which receives the surplus water, is connected by a pipe 10 to a pump 11 which returns the water, by way of a pipe 12, to the delivery device 2 for re-use.

Side plates 4 used as lateral retaining means in apparatus in accordance with the invention may conveniently have grooves for the reception and guidance of the edges of a conveyor band. Figs. 8 and 8a illustrate such a side plate 4 with a groove 13 appropriately curved to guide the band in the pocket zone 9.

Conveyors forming parts of apparatus in accordance with the invention may comprise bands with continuous surfaces, made of heat and water resisting steel or other suitable material, or band conveyors may be used comprising articulated members coupled together. Examples of the latter types of conveyor are illustrated diagrammatically by Figs. 9, 10 and 11.

In any case it may be desirable to provide means for assisting in the disposal of the heat imparted to the band conveyor by the molten material and to stiffen against buckling under the intense heat: thus, for example, transverse members of angle section (as indicated at 14 in Figs. 9 and 10) or of other section may be secured to the underside (that is the side underneath in the working zone) or slight corrugations of just sufficient size to produce the required stiffening may be provided as at 15 in Fig. 11.

In apparatus in accordance with the invention, the foamed or granulated material is automatically removed from the water treatment zone by the action of the conveyor: this removal may be assisted, especially when the conveyor as a whole is inclined, as in Figs. 5 and 7, by the provision of pegs or other obstructions; the provision of pegs or the like on a conveyor band 1 is indicated diagrammatically at 16 in Fig. 13.

In the production of normal foamed materials, the quantity of water required to be present at any one time in the water-treatment zone is relatively small and the layers of water and "pockets" formed to receive them will usually be relatively shallow. The production of granulated material requires the presence of a relatively large volume of water and this can be provided for by increasing the depth, and thus the water capacity, of a water-receiving pocket.

In some cases, the water-treatment zone may be provided by running the foaming or granulating end of the conveyor through a water bath, as illustrated diagrammatically in Fig. 15; in this way, regulation of the depth of water in the treatment zone may be facilitated and the problem of collecting and dealing with surplus water is removed. The effective depth of the water in the water treatment zone may be adjusted by raising or lowering the water bath 17 relatively to the conveyor 1.

Foaming apparatus previously proposed has been of relatively large dimensions in order that it might be of reasonable capacity and yet permit the material under treatment to remain for as long a time as possible in the apparatus to avoid destruction of the still plastic cell walls. Apparatus of the "foaming wheel" type thus requires considerable headroom and the space requirement, as well as the cost of establishing and maintaining the plant, is increased if a conveyor has to be added to receive the foamed plastic material from the wheel and allow it to solidify and cool before being loaded into trucks or otherwise disposed of. A single piece of apparatus in accordance with the present invention may be considered as providing, in effect, the combination of two distinct items, namely apparatus for carrying out the foaming or like process and apparatus for dealing with the material during cooling or other after-treatment.

Since foaming is most advantageously carried out at the source of the molten material, headroom is of considerable importance and apparatus in accordance with the invention is very advantageous in this respect, owing to the small headroom required and will make foaming at the furnace possible in cases where the hitherto known methods prove impracticable. Further, increase of the productive capacity of a plant in accordance with the invention is provided for by increasing the width of the conveyor and not the overall height, the depth of a water-receiving pocket being determined mainly by the amount of water per unit volume of molten material required for the correct foaming (or granulation) of the material to be treated.

Material foamed in apparatus in accordance with the invention passes from the water treatment zone simply by the action of the band conveyor upon which it remains for completion of the foaming process, solidification and cooling without interference with the cellular nature of the material, the final product thus exhibiting to the full, the desirable property of lightness. The time occupied by the various stages of the whole process may be controlled by the rate of movement of the band conveyor, which may move continuously or intermittently, sluggishly-foaming materials being in this way permitted to remain in contact with the water for relatively longer periods, and the nature of the treatment at the individual stages can also be determined by the shape and relative dimensions of the parts of the apparatus forming the water-treatment zone and by the length of the conveyor path available for the material after it has left the water-treatment zone. Further the conveyor may carry the foamed or granulated material through a drying stove, kiln or other treating station and finally deliver the finished product into the requisite receptacles.

A form of apparatus especially intended for use in granulation processes is illustrated by Fig. 16.

As shown, part or the whole of the chute 3 (by which the molten material is led to the conveyor) and part or whole of the band conveyor 1 are enclosed by a duct 18, through which air is caused to pass, for example by the suction of a fan applied at the end A of the duct.

The air, in passing over the chute 3, is heated by the molten material and has a drying effect upon the granulated material being carried on the band conveyor 1 after removal from the water-treatment zone 9.

Although apparatus in accordance with the invention is intended primarily to avoid the disadvantages of previously proposed forms of apparatus, it may be desirable in some cases to use it in conjunction with other forms of apparatus, thus, for example, material may be first subjected to a preliminary foaming in a foaming wheel and then dropped into the pocket of the conveyor, where a small quantity of additional water will continue the foaming, the material subsequently being removed from the pocket by the action of the conveyor.

I claim:

1. Apparatus for treating molten material comprising a movable band conveyor having a working run, means for supplying water to the surface of said run at a predetermined zone, means for guiding the working run of the conveyor to provide a depression therein thereby to retain the water in said zone, and means for delivering molten material to said zone.

2. Means for treating molten material comprising a movable band conveyor having a portion of the conveying surface inclined at an angle, means for damming water against this inclined surface, means for supplying water thereto, and means for delivering molten material into the water so dammed.

3. Apparatus for treating molten material comprising a movable band conveyor having a working run, means for supplying water to the surface of said run at a predetermined zone, plates at each side of the conveyor to retain the water in said zone, and means for delivering molten material to said zone.

4. Apparatus for treating molten material comprising a movable band conveyor having a continuous flat surface substantially throughout its extent, means for supplying water to the surface of said band at a predetermined zone, upwardly projecting portions at the edges of the conveying surface of the conveyor to retain the water at said zone, and means to deliver molten material to said zone.

5. Apparatus for treating molten material comprising a movable band conveyor having a working run, means for supplying water to the surface of said run at a predetermined zone, means guiding said run to define a trough longitudinally thereof to retain the water at said zone, and means to deliver molten material into the water confined to a portion of the trough.

MARCEL GALLAI-HATCHARD.